(12) United States Patent
Groft et al.

(10) Patent No.: US 11,492,798 B2
(45) Date of Patent: Nov. 8, 2022

(54) UNDERPAYMENT WITH THERMAL INSULATION

(71) Applicant: Environmentally Safe Products, Inc., New Oxford, PA (US)

(72) Inventors: Cory L. Groft, Littlestown, PA (US); Thomas W. Dauber, Spring Grove, PA (US); Thomas E. Wright, Biglerville, PA (US)

(73) Assignee: ENVIRONMENTALLY SAFE PRODUCTS, INC., New Oxford, PA (US)

( * ) Notice: Subject to any disclaimer, the term of this patent is extended or adjusted under 35 U.S.C. 154(b) by 79 days.

(21) Appl. No.: 16/800,926

(22) Filed: Feb. 25, 2020

(65) Prior Publication Data

US 2021/0017760 A1     Jan. 21, 2021

Related U.S. Application Data

(63) Continuation of application No. 14/942,598, filed on Nov. 16, 2015, now Pat. No. 10,570,612.

(51) Int. Cl.
*E04B 1/80*     (2006.01)
*B32B 5/02*     (2006.01)
(Continued)

(52) U.S. Cl.
CPC ............ *E04B 1/80* (2013.01); *B32B 3/06* (2013.01); *B32B 5/024* (2013.01); *B32B 5/028* (2013.01);
(Continued)

(58) Field of Classification Search
CPC .. E04B 1/80; B32B 5/028; B32B 5/20; B32B 15/085; B32B 27/32; B32B 37/16;
(Continued)

(56) References Cited

U.S. PATENT DOCUMENTS 4,014,150 A ‡ 3/1977 Wells .................. E04D 13/1637
52/461
4,058,949 A ‡ 11/1977 Bellem ................. E04D 3/3602
52/407
(Continued)

FOREIGN PATENT DOCUMENTS

CN     201031473    ‡   3/2008
EP      1715111     ‡   10/2006
(Continued)

*Primary Examiner* — George R Koch
*Assistant Examiner* — Christopher C Caillouet
(74) *Attorney, Agent, or Firm* — Nixon Peabody LLP

(57) ABSTRACT

An underlayment that meets underlayment requirements and provides thermal insulation is disclosed. The underlayment includes a core material and an upper emittance layer having an exterior surface. An upper reinforcement layer is positioned between the upper emittance layer and the core material. A first encapsulation layer is positioned between the upper emittance layer and the upper reinforcement layer. A second encapsulation layer is positioned between the upper reinforcement layer and the core material. The underlayment includes a lower emittance layer having an exterior surface. A lower reinforcement layer is positioned between the lower emittance layer and the core material. A third encapsulation layer is positioned between the lower emittance layer and the lower reinforcement layer. A fourth encapsulation layer is positioned between the lower reinforcement layer and the core material.

9 Claims, 3 Drawing Sheets

(51) Int. Cl.
  *E04D 12/00* (2006.01)
  *B32B 5/20* (2006.01)
  *B32B 15/085* (2006.01)
  *B32B 15/20* (2006.01)
  *B32B 27/12* (2006.01)
  *B32B 27/32* (2006.01)
  *B32B 27/36* (2006.01)
  *B32B 3/06* (2006.01)
  *B32B 5/18* (2006.01)
  *B32B 27/06* (2006.01)
  *B32B 7/04* (2019.01)
  *B32B 37/16* (2006.01)
  *B32B 37/06* (2006.01)
  *E04B 1/76* (2006.01)

(52) U.S. Cl.
  CPC ............... *B32B 5/18* (2013.01); *B32B 5/20* (2013.01); *B32B 7/04* (2013.01); *B32B 15/085* (2013.01); *B32B 15/20* (2013.01); *B32B 27/06* (2013.01); *B32B 27/065* (2013.01); *B32B 27/12* (2013.01); *B32B 27/32* (2013.01); *B32B 27/36* (2013.01); *B32B 37/06* (2013.01); *B32B 37/16* (2013.01); *E04D 12/002* (2013.01); *B32B 2250/05* (2013.01); *B32B 2250/40* (2013.01); *B32B 2262/0253* (2013.01); *B32B 2262/0276* (2013.01); *B32B 2262/101* (2013.01); *B32B 2262/14* (2013.01); *B32B 2266/025* (2013.01); *B32B 2266/08* (2013.01); *B32B 2305/022* (2013.01); *B32B 2307/304* (2013.01); *B32B 2307/31* (2013.01); *B32B 2307/40* (2013.01); *B32B 2307/416* (2013.01); *B32B 2307/54* (2013.01); *B32B 2307/714* (2013.01); *B32B 2307/7246* (2013.01); *B32B 2307/732* (2013.01); *B32B 2309/10* (2013.01); *B32B 2309/105* (2013.01); *B32B 2311/24* (2013.01); *B32B 2323/04* (2013.01); *B32B 2419/06* (2013.01); *E04B 2001/7691* (2013.01)

(58) Field of Classification Search
  CPC ........ B32B 2305/022; B32B 2307/304; B32B 2309/105; B32B 2323/04; B32B 2419/06; E04D 12/002
  See application file for complete search history.

(56) References Cited

U.S. PATENT DOCUMENTS

| | | | | |
|---|---|---|---|---|
| 4,263,763 A ‡ | 4/1981 | Bouwens | ............... | E04B 9/001 52/404 |
| 4,346,543 A ‡ | 8/1982 | Wilson | ............... | E04D 3/3602 52/404 |
| 4,375,741 A ‡ | 3/1983 | Paliwoda | ............ | E04D 13/1625 52/109 |
| 4,434,601 A ‡ | 3/1984 | Zellmer | ............. | E04D 13/1625 52/407 |
| 4,566,239 A ‡ | 1/1986 | Smigel | ............... | E04B 1/7666 24/460 |
| 4,642,961 A ‡ | 2/1987 | Cruise | ............... | E04D 13/1618 52/404 |
| 4,726,985 A ‡ | 2/1988 | Fay | ........................ | B32B 15/14 428/13 |
| 4,843,774 A ‡ | 7/1989 | Korsgaard | ............... | E04B 7/20 52/408 |
| 5,085,023 A ‡ | 2/1992 | Duffy | ............... | E04D 13/1625 52/407 |
| 5,316,835 A ‡ | 5/1994 | Groft | ..................... | B32B 15/08 442/30 |
| 5,561,959 A ‡ | 10/1996 | Aiderman | .......... | E04D 13/1618 52/404 |
| 6,067,770 A * | 5/2000 | Lubker, II | ............... | B32B 27/32 52/267 |
| 6,128,879 A ‡ | 10/2000 | Bussey, Jr. | ............. | E04B 1/762 52/267 |
| 7,818,922 B2 ‡ | 10/2010 | Ellis | ........................ | E04D 13/17 52/95 |
| 8,156,703 B2 ‡ | 4/2012 | Aiderman | ................ | B32B 3/12 52/309 |
| 2008/0022620 A1 ‡ | 1/2008 | Crowley | ................... | B32B 7/12 52/408 |
| 2011/0094175 A1 ‡ | 4/2011 | Groft | ...................... | E04D 13/1625 52/302 |
| 2011/0287216 A1 ‡ | 11/2011 | Groft | ...................... | B32B 3/266 428/13 |
| 2014/0141199 A1 * | 5/2014 | Leonard | ................... | B32B 3/26 428/317.9 |
| 2016/0016386 A1 ‡ | 1/2016 | Ennis | ..................... | B32B 15/14 428/42 |
| 2017/0210089 A1 * | 7/2017 | Ennis | ..................... | B32B 5/028 |

FOREIGN PATENT DOCUMENTS

| | | | |
|---|---|---|---|
| GB | 2 388 815 | ‡ | 11/2003 |
| GB | 2405415 | ‡ | 3/2005 |
| SK | 50 802 009 U1 | ‡ | 4/2010 |
| WO | WO 95/12724 | ‡ | 5/1995 |
| WO | WO 2008/002934 | ‡ | 1/2008 |

\* cited by examiner
‡ imported from a related application

| | Under Shingles No Airspace | Metal or Clay Tile .5" Reflective Airspace | Metal or Clay Tile .75" Reflective Airspace | Metal or Clay Tile 1.5" Reflective Airspace | Metal or Clay Tile 3.5" Reflective Airspace |
|---|---|---|---|---|---|
| Thermasheet .218" (5.56mm) | | | | | |
| Rvalue IP | 1 | 3.5 | 4.5 | 6.6 | 9.2 |
| Rvalue SI | 0.17611 | 0.616385 | 0.792495 | 1.162326 | 1.620212 |
| U value | 1 | 0.285714286 | 0.222222222 | 0.151515152 | 0.108695652 |
| U value SI | 5.678269264 | 1.622362647 | 1.261837614 | 0.860343828 | 0.617203181 |
| Thermasheet .125" (3.175mm) | | | | | |
| Rvalue IP | 0.5 | 3 | 4 | 6.1 | 8.7 |
| Rvalue SI | 0.088055 | 0.528333 | 0.70444 | 1.074271 | 1.532157 |
| U value | 2 | 0.333333333 | 0.25 | 0.163934426 | 0.114942529 |
| U value SI | 11.35653853 | 1.892756421 | 1.419567316 | 0.930863814 | 0.652674628 |

*Airspaces are created by battens of various thicknesses listed or raised profile of finished roof material
* R and U values are system values that include measured resistance of core material and thermal resistance of plane airspaces. Core R value is derived by ASTM C518 Airspace resistance from ASHRAE Handbook of Fundamentals

FIG. 4

UNDERPAYMENT WITH THERMAL INSULATION

CROSS-REFERENCE TO RELATED APPLICATIONS

This application is a continuation of U.S. patent application Ser. No. 14/942,598, filed Nov. 16, 2015, entitled "Underlayment with Thermal Insulation," now U.S. Pat. No. 10,570,612, which is incorporated herein by reference in its entirety.

TECHNICAL FIELD

The present disclosure relates generally to roofing materials, and more specifically to an improved underlayment satisfying underlayment and thermal insulation functions.

BACKGROUND

For roofing assemblies, building codes require the installation of an underlayment on a roof deck before installing the final roof covering, such as shingles. Such underlayments are typically strips of material that are attached to the roof deck and overlapped to create a downward drainage plane. The underlayment provides a secondary moisture barrier for the roof deck, in addition to the outer roof covering.

One of the functions of a roof system is to insulate a building and, thereby, conserve energy for the heating or cooling energy of a building. It is, therefore, desirable to provide additional thermal insulation to a roof deck of a roof system to both prevent heat from escaping from the building and protect the building from external heat gain for energy efficiency purposes. Thermal insulation is measured by R-value, which is the thermal resistance to heat flow. The U-factor is the inverse, or reciprocal, of the total R-value, i.e.: U-factor=1/Total R-value. A larger R-value means that the material or system has greater thermal resistance and more insulating ability as compared to a smaller R-value. Such R-values can be added together. For instance, for homogeneous assemblies, the total R-value of an insulation assembly is the sum of the R-value of each layer of the assembly. These layers may include sheathing and finishes, the insulation itself, air films, and weatherproofing elements.

Recently, there have been new energy efficiency standards on roofing assemblies to encourage energy efficiency in buildings. One solution to meet the new standards is the use of a reflective insulation material that incorporates a low emittance surface on one or both sides. These materials reflect up to 97% of radiant energy or re-emit up to 3% from the building interior's heat loss or heat gain from the outside. Such reflective insulation may be applied in addition to an approved underlayment to achieve the desired additional thermal insulation for roof systems. One example of a conventional reflective insulation product is Low-E Insulation manufactured by Environmentally Safe Products of New Oxford, Pa.

Like other reflective insulation products, the Low-E product is an effective thermal insulation addition to a metal, tile, or composite shingle roof covering. The application of such products offer the first R-value or values to address the heat before it would enter the attic space. By doing so, reflective insulations such as Low-E Insulation greatly reduce the heat transfer across a roofing system, which allows for lower BTU gain or loss, which in turn equates to energy savings for the consumer.

Such a reflective layer product has been used in roof applications for some time, but requires the additional cost and labor associated into combining it with an approved roof underlayment product. With reflective products in combination with an approved underlayment, the thermal performance aspect is well-received. However, a reflective product must be installed with an International Code Council (ICC)-approved roofing underlayment. This dual-product approach equates to extra material cost in addition to more than twice the labor cost, since the extra reflective product must be installed in addition to the conventional underlayment. Due to the conventional reflective insulation products not having ICC approval as a standalone underlayment, these costs are required for the redundant application of the thermal sheet to approved underlayment to be considered compliant with ICC and other building code standards. This extra cost significantly extends the cost-cycle payback for the consumer and, hence, limits the full value to the construction market and its consumers.

Currently, underlayment products must comply with ASTM D 226, Type I or ASTM D 4869 Type I standards under ICC Acceptance Criteria 188 (ICC AC 188). The specific Acceptance Criteria required to meet this code is detailed in http://www.icc-es.org/Criteria_Development/1202-post/9_AC188_final.pdf. Reflective products such as Low-E Insulation do not meet the criteria of ICC AC 188.

This cost-to-benefit ratio leaves many users unable to enjoy the benefits of an energy upgrade to a roof due to the additional upfront investment in the reflective layer product combined with approved underlayment. To be considered an energy-efficiency upgrade, the reflective layer product must meet strict criteria for aging and weathering of samples before testing physical properties in accordance with AC 188. Reflective products of traditional designs do not meet these standards and require reformatting of the design to meet benchmarks. Thus, even if the additional upgrades are implemented, the lack of a reflective product that meets standards is an impediment to upgrading existing roofs and installed underlayments.

An insulation or insulation system is measured for thermal performance. However, it is also measured for cost-cycle payback. The former is well known, as all products are marketed on their R- or U-value contribution to the system. However the latter is as important a factor, if not more important than thermal performance. The laws of diminishing returns demonstrate this point. Consider constructing a system that is twice as good as a thermal code requirement with regard to R-value, but requires four times the cost as a code compliant system. Although one is far superior with regard to thermal performance, as stated by R-value, the diminishing returns demonstrate a far less than two times the effect to energy performance. To achieve this two times R standard, a larger capital investment must be made. When applying the laws of diminishing returns to increased R-value and the additional investment, the time it takes for investment to produce a return is far too long and, although the superior system produces additional savings when compared to the standard, the effect is nominal. The performance/investment return for an energy upgrade is the cost-cycle payback. Although energy upgrades should be performed for existing or new structures for energy-conservation purposes, applying this balanced approach of the cost-cycle payback allows consumers to make a more-informed decision when investing in the energy performance of their homes. For this reason, all insulation products and/or systems are weighed for this measurement, as well as for specific thermal performance.

Attempts to provide an underlayment product with appropriate insulation have failed. The addition of insulation requires strength in both machine- and cross-direction, creating the need for reinforcement in the form of a reinforcement layer or layers. However, aging and weathering cause such products to fail because the reinforcement layer promotes wicking of moisture and causes delamination of the product when using traditional design practices.

Accordingly, a need exists for providing an underlayment that meets the building code's AC 188 Standard but also provides a thermal insulation. There is also a need for an underlayment that provides thermal insulation but may be installed as a conventional underlayment. There is also a need for an underlayment with appropriate reinforcement materials that does not interfere with moisture resistance.

SUMMARY

One disclosed example is an underlayment for roofing assemblies. The underlayment includes a core material and an upper emittance layer having an exterior surface. An upper reinforcement layer is positioned between the upper emittance layer and the core material. A first encapsulation layer is positioned between the upper emittance layer and the upper reinforcement layer. A second encapsulation layer is positioned between the upper reinforcement layer and the core material. The underlayment includes a lower emittance layer having an exterior surface and a lower reinforcement layer between the lower emittance layer and the core material. A third encapsulation layer is positioned between the lower emittance layer and the lower reinforcement layer. A fourth encapsulation layer is positioned between the lower reinforcement layer and the core material.

Another example is a roofing assembly having thermal insulation for supporting a roof covering. The roofing assembly includes a roof deck having a flat surface area and a plurality of underlayments overlapping each other on the flat surface area. Each of the underlayments include a core material, an upper emittance layer having an exterior surface, and an upper reinforcement layer between the upper emittance layer and the core material. A first encapsulation layer is positioned between the upper emittance layer and the upper reinforcement layer. A second encapsulation layer is positioned between the upper reinforcement layer and the core material. Each of the underlayments includes a lower emittance layer having an exterior surface and a lower reinforcement layer between the lower emittance layer and the core material. A third encapsulation layer is positioned between the lower emittance layer and the lower reinforcement layer. A fourth encapsulation layer is positioned between the lower reinforcement layer and the core material.

Another example is a method of manufacturing an underlayment with thermal insulation. An upper foil laminate including an upper emittance layer having an exterior surface, an upper reinforcement layer, a first encapsulation layer between the upper emittance layer and the upper reinforcement layer and a second encapsulation layer on the upper reinforcement layer opposite the first encapsulation layer is assembled. A lower foil laminate including a lower emittance layer having an exterior surface, a lower reinforcement layer, a third encapsulation layer between the lower emittance layer and the lower reinforcement layer and a fourth encapsulation layer on the lower reinforcement layer opposite the third encapsulation layer is assembled. The upper foil laminate is placed over a core material. The lower foil laminate is placed under the core material. The upper foil laminate, core material and lower foil laminate are laminated together to form the underlayment.

Still other aspects, features, and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 is a table of R- and U-values for the improved underlayment sheet in FIG. 1 for various roof systems.

DETAILED DESCRIPTION

An underlayment product having thermal insulation properties is described. In the following description, for purposes of explanation, numerous specific details are set forth to provide a thorough understanding of the exemplary embodiments. It is apparent to one skilled in the art, however, that the present invention can be practiced without these specific details or with an equivalent arrangement.

Figure 1:
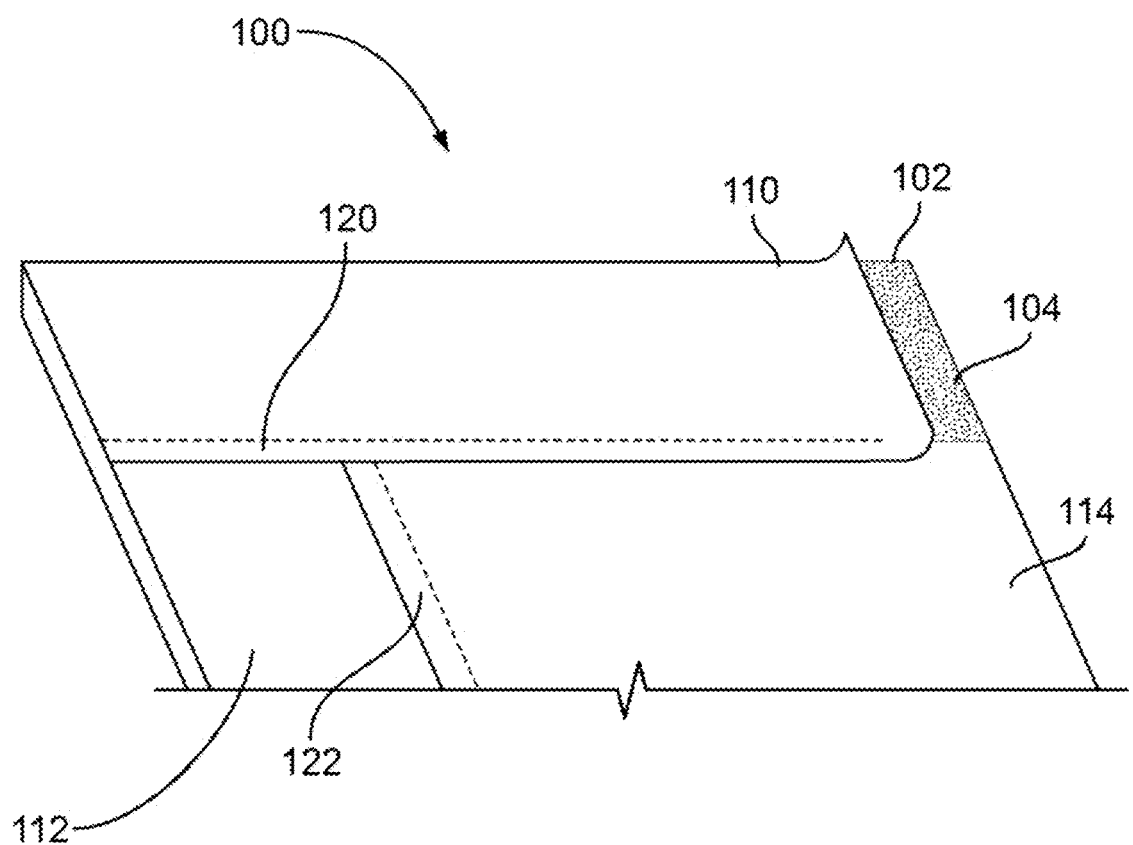
FIG. 1 shows the application of an improved underlayment sheet providing thermal insulation on a roof assembly.

FIG. 1 is a perspective view of a roofing assembly 100 that includes an underlayment 110 that is attached to a roof deck 102 before the application of a roof covering (not shown) such as shingles. The underlayment 110 in this example is an approved roofing underlayment as defined by ICC AC 188 while providing thermal insulation performance to the roofing assembly 100. The roofing assembly 100 includes the roof deck 102 having a flat surface 104 defined by outer edges or eaves. The roof deck 102 covers the underlying building and supports the roof covering that will serve as the exterior to the roof assembly 100. The underlayment 110 in this example is shaped as a rectangular strip having a width of 4 feet, a 4 inch flange, and a length of 125 feet. The thicknesses of the underlayment 110 may range from approximately ⅛ inch and 7/32 inch in this example. The flange of the underlayment 110 in this example overlaps laterally in an area 120 with two other underlayments 112 and 114. A vertical overlap 122 is applied on the side surface of the underlayments 112 and 114. Thus, the underlayments 110, 112, and 114 are applied to the roof deck 102 in overlapping fashion to cover the entire flat surface 104.

Figure 2:
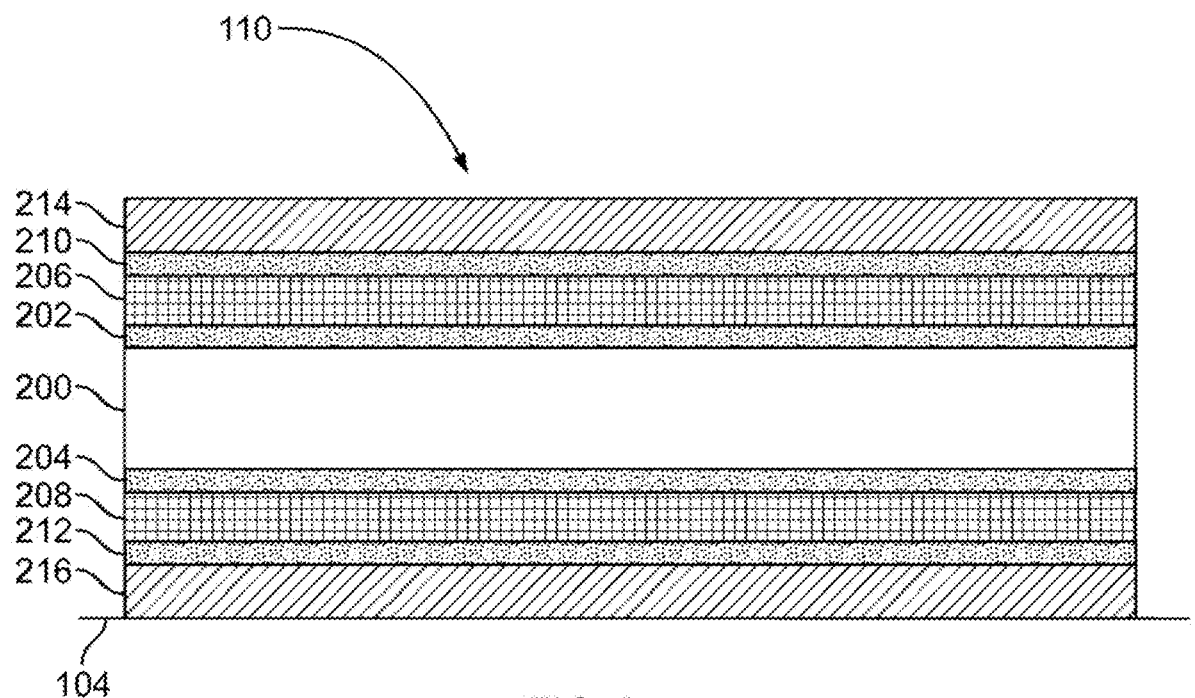
FIG. 2 is a cross-section view of the improved underlayment sheet shown in FIG. 1.
Figure 3:
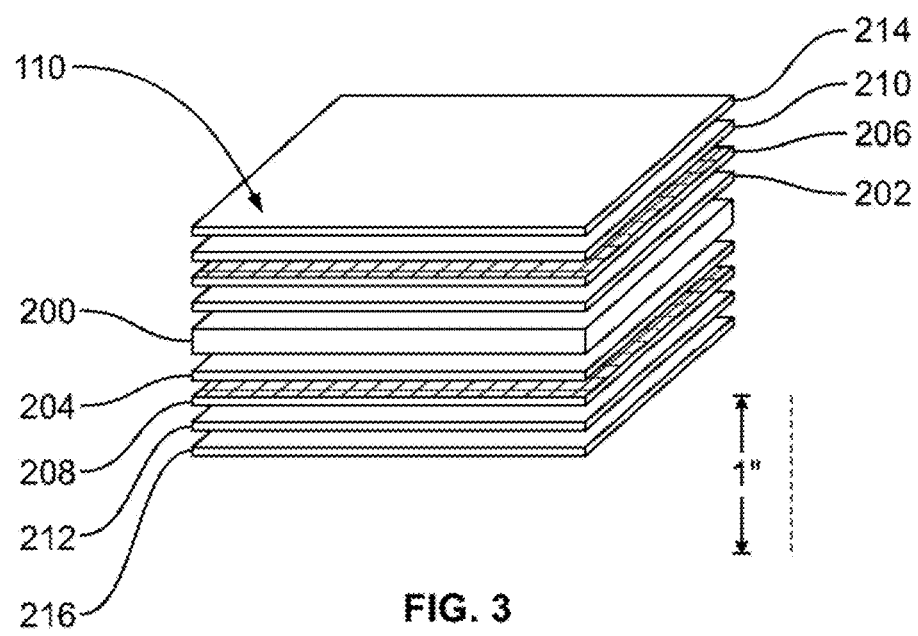
FIG. 3 is an exploded view of the layers of the improved underlayment sheet in FIG. 1.

FIG. 2 is a cross-section of the underlayment 110 and FIG. 3 is an exploded view of the components of the underlayment 110 in FIG. 1. The underlayment 110 includes a non-permeable core material 200. In this example, the core material 200 is a closed-cell polyethylene foam, but other core materials such as polyolefin foam or bubble packaging materials could be used. In this example, the material 200 has a thickness of 1/8" (125 mil) or 7/32" (218.7 mil). Other ranges of thicknesses may range from 1/16" (62.5 mil) to 1/2" (500 mil) for the core material 200. The core material 200 serves the underlayment function as a moisture barrier.

An upper non-permeable encapsulation layer 202 and a lower non-permeable encapsulation layer 204 are located on the top and the bottom of the non-permeable core material 200. The encapsulation layers 202 and 204 are composed of 0.0005 inch thick polyethylene heat seal. Alternative materials for the encapsulation layers 202 and 204 include other members of the polyolefin family such as polypropylene, polyester, etc. The encapsulation layers 202 and 204 may vary between +50% and −10% in thickness and, therefore, may be between 0.001 and 0.0002 inches in thickness.

An upper reinforcement material layer 206 is joined to the surface of upper non-permeable encapsulation layer 202 opposite the core layer 200. A lower reinforcement material layer 208 is joined to the surface of the lower non-permeable encapsulation layer 204 opposite the core layer 200. In this example, the upper reinforcement material 206 is a 2×2 fiberglass scrim material. Scrim is a term known in the art to refer to crossed lines of plastics or other appropriate material that serve to strengthen the overall product and to prevent stretching damage to the layers. The 2×2 references 2 yarns vertically and 2 yarns of scrim horizontally per every square inch of surface area. Alternatively, cross-woven scrim, polyester, polyethylene, or polypropylene materials constructed in various patterns such as 5×5, tri-D, Diamond, and 8×8 may be used for the upper reinforcement material 206. In this example, the lower reinforcement material 208 is a 5×5 fiberglass scrim. Alternatively, cross-woven scrim, polyester, polyethylene, or polypropylene materials constructed in various patterns such as 2×2, tri-D, Diamond, and 8×8 may be used. In this example, the combination of the 2×2 scrim on the upper reinforcement material 206 and the 5×5 scrim on the lower reinforcement material 208 achieves the tensile strength required for finished product.

In this example, the scrim material for the reinforcement layers 206 and 208 provides the underlayment 110 with a tensile strength of approximately 42.8 pounds per inch width in a machine direction and 39.9 pounds per inch width in a cross-machine direction on a test specimen where the test specimen has a size of approximately 1" wide by 6" long.

Another upper encapsulation layer 210 is joined to the opposite surface of the upper layer reinforcement material 206. Another lower encapsulation layer 212 is joined to the opposite surface of the lower layer reinforcement material 208. The encapsulation layers 210 and 212 are composed of 0.0005 inch thick polyethylene heat seal. The encapsulation layers 210 and 212 may also be between 0.001 and 0.0002 inches in thickness.

The top and bottom surfaces of the underlayment 110 are composed of a top low-emittance layer 214 and a bottom low-emittance layer 216. The emittance layers 214 and 216 in this example are composed of 0.0003 inch thick Aluminum. The thickness of the emittance layers 214 and 216 may be +50% to −10% or 0.0005 inches to 0.0001 inches. Alternatively, the emittance layers 214 and 216 may be metalized polyester or other low-emittance facing materials. Alternatively, the emittance material may be a reflective material such as approximately 99.4% polished aluminum. The reflective material may be a facing having any suitable amount of emissivity, for example, greater than about 85%, preferably between about 90%-95% and about 99.9%, even more preferably between about 99.0% and about 99.9%.

Thus, the underlayment 110 includes the core material 200, an upper emittance layer 214 having an exterior surface and the upper reinforcement layer 206 between the upper emittance layer 214 and the core material 200. The encapsulation layer 210 is positioned between the upper emittance layer 214 and the upper reinforcement layer 206. The encapsulation layer 202 is positioned between the upper reinforcement layer 206 and the core material 200. The underlayment 110 also includes the lower emittance layer 216 having an exterior surface and the lower reinforcement layer 208 between the lower emittance layer 216 and the core material 200. The encapsulation layer 212 is positioned between the lower emittance layer 216 and the lower reinforcement layer 208. The encapsulation layer 204 is positioned between the lower reinforcement layer 208 and the core material 200. In this manner, the reinforcement layers 206 and 208 are encapsulated and do not wick moisture, allowing the underlayment 110 to provide moisture resistance.

In standard practice, before installing the underlayment 110, the deck surface must be dry and free of dust, dirt, loose nails, and other protrusions. As explained above, the top surface of the underlayment 110 is the emittance layer 214 and is reflective. Thus, the underlayment 110 meets International Building Code (IBC) Chapter 9 and Chapter 15, since a reinforced aluminum foil top surface faces up. In this example, the underlayment 110 is laid horizontally (parallel to the eave of the roof deck 102) with 4-inch (102 mm) horizontal and 6-inch (152 mm) vertical laps as shown in FIG. 1. The additional underlayments 112 and 114 are installed in the same manner as the initial underlayment 110 with a 4-inch flange of the upper underlayment, such as the underlayment 112 laid over the lower underlayment such as the underlayment 110. The overlaps run with the flow of water in a shingling fashion.

The underlayments, such as the underlayment 110, are attached to the roof deck 102 with a minimum of No. 12 gage (0.109 inch shank diameter (2.77 mm)) corrosion-resistant steel roofing nails having a minimum 3/8 inch diameter (9.5 mm) heads along with a minimum 1-inch diameter (25.4 mm) plastic caps. Alternatively, No. 16 gage (0.065 inch leg diameter (1.65 mm)) corrosion resistant stapes having minimum 7/8 inch crowns (11.1 mm) may be used. The fasteners must be long enough to penetrate into the sheathing of the roof deck 102 to a minimum of 3/4 inch (19.1 mm) or through the sheathing, whichever is less.

If battens are installed over the underlayment 110, the underlayment 110 only has to be preliminarily attached to the roof deck 102 pending attaching of the battens or counterbattens.

The minimum roof slope is 2:12 (17 percent). For roof slopes from 2:12 (17 percent) up to but not including 4:12 (33 percent) covered with asphalt shingles, the underlayment must include two layers and be applied in accordance with IBC Section 1507.2.8 or IBC Section R905.2.7. In this instance, the underlayment 110 may serve as one of the layers and provide thermal insulation while another layer of the underlayment may conform to either ASTM D2226, Type I; ASTM D4869, Type I; or ASTM D6757, installed in accordance with IBC Section 1507.2.8 or IBC Section R905.2.7.

For roof slopes from 2½: 12 (21 percent) up to but not including 4:12 (33 percent), where the roof is covered with clay or concrete tiles, the underlayment must include two layers and be applied in accordance with IBC Section 1507.3.3.1 or IBC Section R905.3.3.1. In this instance, the underlayment 110 may serve as one of the layers and provide thermal insulation while another layer of the underlayment may conform to either ASTM D2226, Type I; ASTM D4869, Type I; or ASTM D6757, installed in accordance with IBC Section 1507.2.8 or IBC Section R905.2.7.

For slopes of 4:12 (33 percent) or greater, the underlayment must be a minimum of one layer and be applied in shingle fashion.

For roofs required to have ice barriers, one layer of the underlayment 110 and a layer of an approved roofing underlayment are cemented together with roofing cement complying with ASTM D4586, or one layer of self-adhering polymer-modified bitumen sheet complying with ASTM D1970, or one layer of an ice barrier complying with ICC-ES Acceptance Criteria for Self-adhered Roof Underlayments for Use as Ice Barriers (AC48). The underlayment is applied over the solid substrate in sufficient courses that the underlayment extends from the eave's edge to a point at least 24 inches (610 mm) inside the exterior wall line of the building. The underlayment 110 applied in the field of the roof overlaps the ice barrier.

In these examples, installation of the roof covering may proceed immediately following the underlayment application. The underlayment is covered by a roof covering in accordance with installation procedures.

The underlayment 110 may be assembled in three different components. The first two components are an upper foil laminate and a lower foil laminate. The upper foil laminate includes the emittance layer 214, the encapsulation layers 202 and 210, and the upper layer reinforcement layer 206. The lower foil laminate includes the emittance layer 216, the encapsulation layers 204 and 212, and the lower layer reinforcement layer 208. The foam core material 200 is a separate third component. The components are routed on a flame lamination machine to combine the layers in the correct sequence to achieve the finished underlayment 110. The upper and lower foil laminate layers are loosely held together before lamination. The flame laminator fuses all of the components and encapsulates the reinforcement material layers 206 and 208 by applying intense heat and pressure to two nip points while the components are in motion. In this example, the upper and lower foil laminates are applied at a rate of approximately 125 lineal feet per minute.

The finished underlayment comes out of this process in large master rolls where all layers are infused to one another and the reinforcement layers 206 and 208 are encapsulated by the respective encapsulation layers 202 and 210 and layers 204 and 212. The master rolls are then sent to a rewind station, where they are inspected for any defects and converted into Standard size rolls of 500 square feet (4×125) for distribution and application to a roof deck.

The underlayment 110 has the unique ability to be considered an approved roofing underlayment as defined by ICC AC 188, while providing thermal performance to a roofing assembly. Encapsulation of the reinforcement material layers 206 and 208 by the encapsulation layers 202 and 210 and 204 and 212, respectively, achieves both thermal performance and insulation. The underlayment 110 allows cooling of roof assemblies with a single layer of covering.

FIG. 4 is a table that shows the various R- and U-values for the underlayment 110 having an overall thickness of 0.125 inch in different roof systems. FIG. 4 also shows the various R- and U-values for an underlayment similar to the underlayment 110 with an overall thickness of 0.218 inch. The R- and U-values are system values that include measured resistance of the core material 200, and thermal resistance of plane airspaces is applicable. The core R-value is derived by ASTM C518 and the airspace resistance is from the ASHRAE Handbook of fundamentals. The R-value includes an IP R-value that is in imperial units and an SI R-value that is in the international system of scientific units (SI). The U-value is the reciprocal of the respective R-values.

FIG. 4 shows the R- and U-values for a roof system having the underlayment in FIG. 2 under shingles with no airspace. Thus, the R-value of the underlayment 110 having an overall thickness of 0.125 inch by itself is 0.5 (0.088 SI) and an underlayment having an overall thickness of 0.218 inch is 1 (0.176 SI). Thus, the R-value of the example underlayment 110 may range between about 0.5 and 1. Of course, other R-values may be achieved with a thicker or thinner core material 200. FIG. 4 also shows the R- and U-values for a roof system with different reflective airspaces between 0.5 inch and 3.5 inches using metal or clay tile roofing. The airspaces are created by battens of various thicknesses listed or the raised profile of the finished roof material.

The underlayment 110 combines the benefits of reflective insulation technology and standards needed to be considered a roofing underlayment into one product. Strength in both machine- and cross-direction is achieved by the reinforcement layers 206 and 208. The encapsulations layers around the reinforcement layers prevent wicking of moisture that causes delamination when using traditional design practices.

The advantages include providing a single underlayment that meets ICC-approved roofing underlayment and thermal insulation combined in one product. The use of a single sheet as opposed to multiple sheets results in reduced material cost and reduced labor costs. The single sheet reduces energy consumption by the thermal insulation. The cost-cycle payback is therefore reduced.

The present combined underlayment 110 meets age-cycle testing and, therefore, passes property testing and certification. As explained above, the underlayment 110 includes encapsulated reinforcement material that isolates the reinforcement material from moisture and wicking. This encapsulation allows the underlayment 110 to serve two functions of an underlayment and thermal insulation with one product. The underlayment 110 meets ICC certification with regard to ICC ES AC 188. The ICC certification allows the underlayment 110 to meet underlayment requirements in ICC, IRC, and other building code books as demonstrated in IRC R905.2.3.

The ICC listing of the example underlayment 110 in conformance to the ICC AC 188 standard can be found at (http://www.icc-es.org/Reports/pdf_files/load_file.cfm?file_type=pdf&file_name=ESR-3652.pdf).

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method of manufacturing an underlayment with thermal insulation, the method comprising:
    assembling an upper foil laminate including an upper low-emittance reflective layer having an exterior surface, an upper scrim layer, a first encapsulation layer between the upper low-emittance reflective layer and the upper scrim layer, and a second encapsulation layer on a side of the upper scrim layer opposite the first encapsulation layer;

assembling a lower foil laminate including a lower low-emittance reflective layer having an exterior surface, a lower scrim layer, a third encapsulation layer between the lower low-emittance reflective layer and the lower scrim layer, and a fourth encapsulation layer on a side of the lower scrim layer opposite the third encapsulation layer;

placing the upper foil laminate over an insulating layer that includes a closed-cell foam core material;

placing the lower foil laminate under the insulating layer; and laminating the upper foil laminate, the insulating layer, and the lower foil laminate together to form the underlayment, wherein the underlayment has a total thickness ranging from about 1/8 inches to about 7/32 inches, and wherein the underlayment has an R-value of between about 0.5 and about 1.

2. The method of claim 1, wherein the insulating layer includes closed cell polyethylene foam, polyolefin, or both.

3. The method of claim 1, wherein the upper scrim layer and the lower scrim layer are made of fiberglass or plastic material.

4. The method of claim 1, wherein the upper scrim layer and the lower scrim layer are each in one of a 2×2, 5×5, 8×8, tri D, or Diamond pattern.

5. The method of claim 1, wherein each of the encapsulation layers includes polyethylene.

6. The method of claim 1, wherein the upper low-emittance reflective layer and the lower low-emittance reflective layer each include aluminum.

7. The method of claim 1, wherein the exterior surface of the upper low-emittance reflective layer is configured to be positioned either (i) directly adjacent to and in contact with an underside of a roof covering (ii) adjacent to the underside of the roof covering and separated from the underside of the roof covering by only an airspace.

8. The method of claim 7, wherein the exterior surface of the upper low-emittance reflective layer forms an upper outermost exterior surface of the underlayment, and the exterior surface of the lower low-emittance reflective layer forms a lower outermost exterior surface of the underlayment.

9. The method of claim 1, wherein the upper low-emittance reflective layer and the lower low-emittance reflective layer each have an emissivity rating of at least about 85%.

\* \* \* \* \*

UNITED STATES PATENT AND TRADEMARK OFFICE
CERTIFICATE OF CORRECTION

| | |
|---|---|
| PATENT NO. | : 11,492,798 B2 |
| APPLICATION NO. | : 16/800926 |
| DATED | : November 8, 2022 |
| INVENTOR(S) | : Cory L. Groft, Thomas W. Dauber and Thomas E. Wright |

It is certified that error appears in the above-identified patent and that said Letters Patent is hereby corrected as shown below:

On the Title Page

Item (54) and in the Specification Column 1 Line 1, please delete "UNDERPAYMENT" and insert --UNDERLAYMENT-- therefor.

Signed and Sealed this
Twentieth Day of December, 2022

Katherine Kelly Vidal
*Director of the United States Patent and Trademark Office*